United States Patent
Destro et al.

(10) Patent No.: US 10,155,829 B2
(45) Date of Patent: Dec. 18, 2018

(54) STERILIZABLE ARTICLE MADE OF PROPYLENE COPOLYMER

(71) Applicant: BASELL POLIOLEFINE ITALIA S.R.L., Milan (IT)

(72) Inventors: Mara Destro, Ferrara (IT); Marco Ciarafoni, Ferrara (IT); Paola Massari, Ferrara (IT); Tiziana Caputo, Ferrara (IT); Alessandro Guidicini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 284 days.

(21) Appl. No.: 14/906,518

(22) PCT Filed: Jul. 1, 2014

(86) PCT No.: PCT/EP2014/063896
§ 371 (c)(1),
(2) Date: Jan. 20, 2016

(87) PCT Pub. No.: WO2015/010857
PCT Pub. Date: Jan. 29, 2015

(65) Prior Publication Data
US 2016/0159947 A1    Jun. 9, 2016

(30) Foreign Application Priority Data

Jul. 22, 2013 (EP) .................................. 13177342

(51) Int. Cl.
| | | |
|---|---|---|
| *C08F 210/16* | (2006.01) |
| *C08F 210/06* | (2006.01) |
| *C08J 5/00* | (2006.01) |
| *A61J 1/00* | (2006.01) |
| *A61J 1/14* | (2006.01) |

(52) U.S. Cl.
CPC .............. *C08F 210/16* (2013.01); *A61J 1/00* (2013.01); *C08F 210/06* (2013.01); *C08J 5/00* (2013.01); *A61J 1/1468* (2015.05); *C08J 2323/16* (2013.01)

(58) Field of Classification Search
CPC ......... C08F 210/16; C08F 210/06; C08J 5/00; C08J 2323/16; A61J 1/1468
See application file for complete search history.

(56) References Cited

U.S. PATENT DOCUMENTS

| | | |
|---|---|---|
| 8,617,463 B2 | 12/2013 | Grein et al. |
| 9,068,028 B2 | 6/2015 | Collina et al. |
| 2009/0192271 A1 | 7/2009 | Cavalieri et al. |
| 2010/0247375 A1 | 9/2010 | Grein et al. |
| 2010/0285253 A1 | 11/2010 | Hughes et al. |

FOREIGN PATENT DOCUMENTS

| | | |
|---|---|---|
| CN | 102131838 A | 7/2011 |
| EP | 2030996 A1 | 3/2009 |
| EP | 2722348 A1 | 4/2014 |
| JP | H10058526 A | 3/1998 |
| JP | 2001181344 A | 7/2001 |
| JP | 2012530170 A | 11/2012 |
| WO | WO-2008012144 A1 | 1/2008 |
| WO | WO-2009054833 A2 | 4/2009 |
| WO | WO-2009067337 A1 | 5/2009 |
| WO | WO-2012084768 A1 | 6/2012 |
| WO | WO-2012139897 A1 | 10/2012 |

OTHER PUBLICATIONS

PCT International Search Report and the Written Opinion—Nov. 24, 2014 (Nov. 24, 2014) for Corresponding PCT/EP2014/063896.

*Primary Examiner* — Michael C Miggins

(57) ABSTRACT

The present technology relates to articles for use in healthcare or medical applications, such as blow-fill-seal applications, made of a propylene-ethylene random copolymer that demonstrate good optical properties after heat sterilization.

20 Claims, No Drawings ial Application PCT/EP2014/063896, filed Jul. 1, 2014, claiming benefit of priority to European Patent Application No. 13177342.6, filed Jul. 22, 2013, the contents of which are incorporated herein by reference in its entirety.

STERILIZABLE ARTICLE MADE OF PROPYLENE COPOLYMER

This application is the U.S. National Phase of PCT International Application PCT/EP2014/063896, filed Jul. 1, 2014, claiming benefit of priority to European Patent Application No. 13177342.6, filed Jul. 22, 2013, the contents of which are incorporated herein by reference in its entirety.

FIELD OF THE INVENTION

The present technology relates to a sterilizables article comprising a propylene copolymer. In some embodiments, the technology relates to articles for use in healthcare or medical applications, such as blow-fill-seal applications, that have good optical properties after heat sterilization. The technology also relates to a process for the production of the propylene copolymer.

BACKGROUND OF THE INVENTION

Propylene polymers are having increasing success as materials for the manufacture of articles for use in healthcare and medical applications. These articles include containers, such as bottles, bags and pouches, for biologic liquids, syringes and other items that can be sterilized by autoclaving. The material's success is due, in part, to a good balance of mechanical properties and resistance to sterilization treatment. It is important that the properties of the material used for this kind of application do not deteriorate after heat treatment for sterilization, and medical/healthcare containers should maintain their transparency after sterilization to enable inspection of their content.

Several attempts have been made to improve the sterilization resistance of propylene polymers, and improvements often result in a higher complexity of the base material.

EP 1849826 B1, for example, describes articles for sterilization comprising a polyolefin composition containing a heterophasic propylene copolymer and an ethylene homopolymer.

EP 2176340 B1 relates to sterilizable polypropylene compositions comprising a matrix resin and an elastomeric resin as the dispersing phase, wherein the matrix resin comprises a propylene homopolymer and a propylene copolymer.

WO 2012/084768 describes a propylene polymer composition having a good balance of elasticity and transparency for use in the preparation if infusion bottles. The composition comprises 60-90% of a crystalline copolymer of propylene, with 1.0-5.0% of ethylene-derived units and 10-40% of a copolymer of propylene with 18-32% of ethylene-derived units. The composition has a melt flow rate value of 1.0-2.0 g/10 min.

It has now been found that, by using specific propylene random copolymers, manufactured articles can be obtained that exhibit surprising optical properties (transparency) after heat sterilization based, in part, on the unexpected finding that the transparency as a function of the comonomer amount shows a deviation from linear behavior.

SUMMARY OF THE INVENTION

The present technology relates to a healthcare or medical article comprising a propylene-ethylene copolymer having a content of ethylene units between 4.0 and 5.4% by weight, such as between 4.3 and 5.3% by weight, and between 4.6 and 5.2% by weight, and having a value of melt flow rate "L" (230° C., 2.16 Kg) of 1.0 to 3.0 g/10 min, including from 1.5 to 2.5 g/10 min.

The present technology relates to multiple healthcare or medical articles. Examples of those articles include:

rigid containers, such as bottles, vials, ampoules, blisters;

flexible containers, such as bags, pouches, collapsible bottles, lidstocks;

other packaging items, such as films;

devices, such as syringes, tubing, needle hubs and protectors, inhalers, filters and filter housings, blood collection systems; and hospital disposables.

In some embodiments, the articles of the present technology include those produced by the Blow-Fill-Seal (BFS) technology, which refers to a manufacturing process used to aseptically manufacture liquid-filled containers. The basic concept of BFS is that a container is formed, filled, and sealed in a continuous process in a sterile enclosed area inside a machine. The present technology can therefore be used to produce sterile pharmaceutical liquid dosage forms for the filling of vials for parenteral preparations and infusions, ophthalmic products and inhalation products.

The articles of the present technology show good optical properties, including good transparency before and after heat sterilization.

The propylene-ethylene copolymers for use in the preparation of a healthcare or medical article of the present disclosure, generally referred to as random copolymer, have good optical properties and generally show haze values, as measured on a 1 mm plaque, of lower than 40%, including lower than 35%, and lower than 30%, without the addition of any clarifying or nucleating agents. After being subjected to heat sterilization their optical properties may become worse, but haze values, as measured on a 1 mm plaque, remain acceptable, for example lower than 45%.

The propylene-ethylene copolymers for use in the article of the present technology comprise, in some embodiments:

a melting temperature ($T_m$) of 135° C. to 140° C.;

a fraction soluble in xylene at room temperature between 10.0 and 15.0% by weight;

a flexural modulus of lower than 700 MPa, both before and after heat sterilisation; and a molecular weight distribution $M_w/M_n$ of higher than 4.0, including higher than 5.0.

The propylene-ethylene copolymer for use in the article of the present technology having a content of ethylene units between 4.0 and 5.4% by weight can be obtained by a process, in certain embodiments, carried out in the presence of a catalyst system comprising the product obtained by contacting the following components:

(a) a solid catalyst component comprising a magnesium halide, a titanium compound having at least a Ti-halogen bond and at least two electron donor compounds, one of which being present in an amount from 40-90% by mole with respect to the total amount of donors and being selected from succinates and the other being selected from 1,3 diethers, (b) an aluminum hydrocarbyl compound, and (c) optionally an external electron donor compound.

The succinate is preferably selected from succinates of the general formula (I):

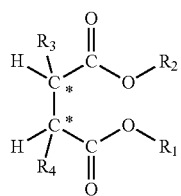

(I)

wherein the radicals R1 and R2, equal to or different from each other, are a C1-C20 linear or branched alkyl, alkenyl, cycloalkyl, aryl, arylalkyl or alkylaryl group, optionally containing heteroatoms; and the radicals R3 and R4 equal to or different from each other, are C1-C20 alkyl, C3-C20 cycloalkyl, C5-C20 aryl, arylalkyl or alkylaryl group such that at least one of them is a branched alkyl; and the compounds being, with respect to the two asymmetric carbon atoms identified in the structure of formula (I), stereoisomers of the type (S,R) or (R,S). For instance, R1 and R2 may be selected from C1-C8 alkyl, cycloalkyl, aryl, arylalkyl and alkylaryl groups, including primary alkyls and branched primary alkyls. Examples of suitable R1 and R2 groups are methyl, ethyl, n-propyl, n-butyl, isobutyl, neopentyl, 2-ethylhexyl. In some embodiments, R3 and/or R4 radicals are secondary alkyls like isopropyl, sec-butyl, 2-pentyl, 3-pentyl or cycloalkyls like cyclohexyl, cyclopentyl, cyclohexylmethyl.

Examples of the above-mentioned compounds are the (S,R) (S,R) forms in pure form or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above are the compounds of the general formula (II):

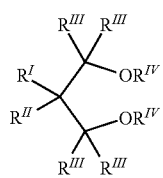

(II)

where RI and RII are the same or different and are hydrogen or linear or branched C1-C18 hydrocarbon groups which can also form one or more cyclic structures; RIII groups, equal or different from each other, are hydrogen or C1-C18 hydrocarbon groups; RIV groups equal or different from each other, have the same meaning of RIII except that they cannot be hydrogen; each of RI to RIV groups can contain heteroatoms selected from halogens, N, O, S and Si. In certain embodiments, RIV is a 1-6 carbon atom alkyl radical, such as a methyl group, while the RIII radicals may be hydrogen. Moreover, when RI is methyl, ethyl, propyl, or isopropyl, RII can be ethyl, propyl, isopropyl, butyl, isobutyl, tert-butyl, isopentyl, 2-ethylhexyl, cyclopentyl, cyclohexyl, methylcyclohexyl, phenyl or benzyl; when RI is hydrogen, RII can be ethyl, butyl, sec-butyl, tert-butyl, 2-ethylhexyl, cyclohexylethyl, diphenylmethyl, p-chlorophenyl, 1-naphthyl, 1-decahydronaphthyl; RI and RII can also be the same and can be ethyl, propyl, isopropyl, butyl, isobutyl, tert-butyl, neopentyl, phenyl, benzyl, cyclohexyl, cyclopentyl.

Specific examples of 1,3-diethers that can be used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, 1,3-diethers of the general formula (III) may be used:

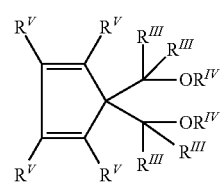

(III)

where the radicals RIV have the same meaning explained above and the radicals RIII and RV radicals, equal or different to each other, are selected from the group consisting of hydrogen; halogens, including Cl and F; C1-C20 alkyl radicals, linear or branched; C3-C20 cycloalkyl, C6-C20 aryl, C7-C20 alkaryl and C7-C20 aralkyl radicals and two or more of the RV radicals can be bonded to each other to form condensed cyclic structures, saturated or unsaturated, optionally substituted with RVI radicals selected from the group consisting of halogens, including Cl and F; C1-C20 alkyl radicals, linear or branched; C3-C20 cycloalkyl, C6-C20 aryl, C7-C20 alkaryl and C7-C20 aralkyl radicals; where the radicals RV and RVI optionally contain one or more heteroatoms as substitutes for carbon or hydrogen atoms, or both.

In some embodiments, in the 1,3-diethers of formulas (I) and (II) all the RIII radicals are hydrogen, and all the RIV radicals are methyl. Moreover, the 1,3-diethers of formula (II) in which two or more of the RV radicals are bonded to each other may form one or more condensed cyclic structures, such as benzenic structures, optionally substituted by RVI radicals. These compounds may include those of the general formula (IV):

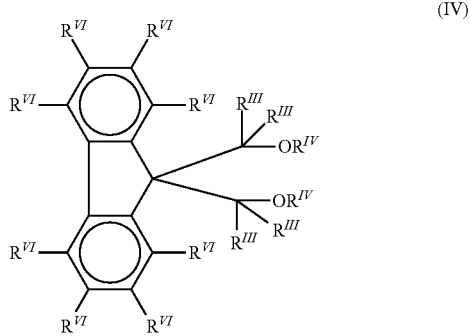

where the RVI radicals equal or different are hydrogen; halogens, such as Cl and F; C1-C20 alkyl radicals, linear or branched; C3-C20 cycloalkyl, C6-C20 aryl, C7-C20 alkylaryl and C7-C20 aralkyl radicals, optionally containing one or more heteroatoms selected from the group consisting of N, O, S, P, Si and halogens, including Cl and F, as substitutes for carbon or hydrogen atoms, or both; where the radicals RIII and RIV are as defined above for formula (II).

Specific examples of compounds comprised in formulas (II) and (III) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxy methyl)-3, cyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the catalyst component (a) comprises, in addition to the above referenced electron donors, a titanium compound having at least a Ti-halogen bond and a Mg halide. The magnesium halide may be MgCl2 in active form, which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form may be used as support or co-support in components of catalysts for the polymerization of olefins and may be characterized by X-ray spectra in which the most intense diffraction line that appears in the spectrum of the non-active halide is diminished in intensity and is replaced by a halo whose maximum intensity is displaced towards lower angles relative to that of the more intense line.

In some embodiments, titanium compounds used in the catalyst component are $TiCl_4$ and $TiCl_3$; furthermore, Ti-haloalcoholates of the general formula $Ti(OR)n-yXy$ can be used, where n is the valence of titanium, y is a number between 1 and n−1, X is halogen and R is a hydrocarbon radical having from 1 to 10 carbon atoms.

In certain embodiments, the catalyst component (a) has an average particle size ranging from 15 to 80 μm, including from 20 to 70 μm and from 25 to 65 μm. As explained above, the succinate is present in an amount ranging from 40 to 90% by weight with respect to the total amount of donors, such as from 50 to 85% by weight and from 65 to 80% by weight, where the 1,3-diether constitutes the remaining amount.

The alkyl-Al compound (b) is, in some embodiments, selected from among the trialkyl aluminum compounds such as, for example triethylaluminum, tri-n-hexylaluminum and tri-n-octylaluminum. It is also possible to use mixtures of trialkylaluminums with alkylaluminum halides, alkylaluminum hydrides or alkylaluminum sesquichlorides such as $AlEt_2Cl$ and $Al2Et_3Cl_3$.

In certain embodiments, external electron-donor compounds include silicon compounds, ethers, esters such as ethyl 4-ethoxybenzoate, amines, heterocyclic compounds such as 2,2,6,6-tetramethyl piperidine, ketones and 1,3-diethers. Another class of external donor compounds is silicon compounds of the general formula $Ra5Rb6Si(OR7)c$, where a and b are integers from 0 to 2, c is an integer from 1 to 3 and the sum (a+b+c) is 4; R5, R6, and R7 are alkyl, cycloalkyl or aryl radicals with 1-18 carbon atoms that optionally containing heteroatoms. These compounds include, in some embodiments, methylcyclohexyldimethoxysilane, diphenyldimethoxysilane, methyl-t-butyldimethoxysilane, dicyclopentyldimethoxysilane, 2-ethylpiperidinyl- 2-t-butyldimethoxysilane and 1,1,1,trifluoropropyl-2-ethylpiperidinyl-dimethoxysilane and 1,1,1,trifluoropropyl-metil-dimethoxy silane. The external electron donor compound is used in such an amount to give a molar ratio between the organo-aluminum compound and the electron donor compound of from 5 to 500, such as from 5 to 400 and from 10 to 200.

The catalyst-forming components can be contacted with a liquid inert hydrocarbon solvent such as, e.g. propane, n-hexane or n-heptane, at a temperature below about 60° C., such as from about 0 to 30° C., for a time period of from about 6 seconds to 60 minutes.

The above catalyst components (a), (b) and optionally (c) can be fed to a pre-contacting vessel in amounts such that the weight ratio (b)/(a) is in the range of 0.1-10 and, if the compound (c) is present, the weight ratio (b)/(c) is weight ratio corresponding to the molar ratio as defined above. In certain embodiments, the components are pre-contacted at a temperature of 10 to 20° C. for 1-30 minutes. The precontact vessel may be a stirred tank reactor.

In some embodiments, the precontacted catalyst is then fed to a prepolymerization reactor where a prepolymerization step takes place. The prepolymerization step can be carried out in a first reactor selected from a loop reactor or a continuously stirred tank reactor, and is generally carried out in liquid phase. The liquid medium comprises liquid alpha-olefin monomer(s), optionally with the addition of an inert hydrocarbon solvent. The hydrocarbon solvent can be aromatic, such as toluene, or aliphatic, such as propane, hexane, heptane, isobutane, cyclohexane and 2,2,4-trimethylpentane. In certain embodiments, the amount of hydrocarbon solvent, if any, is lower than 40% by weight with respect to the total amount of alpha-olefins, such as lower than 20% by weight. In some embodiments, step (i)a is carried out in the absence of inert hydrocarbon solvents.

The average residence time in the reactor generally ranges from 2 to 40 minutes, such as from 5 to 25 minutes, and the temperature ranges between 10° C. and 50° C., such as between 15° C. and 35° C. These condition may produce a pre-polymerization degree in a range from 60 to 800 g per gram of solid catalyst component, including from 150 to 500 g per gram of solid catalyst component. Step (i)a is further characterized by a low concentration of solid in the slurry, for instance in the range from 50 g to 300 g of solid per liter of slurry.

The slurry containing the catalyst, which in some embodiments is in pre-polymerized form, is fed to a gas-phase or liquid-phase polymerization reactor where the copolymer for use in the production of the healthcare or medical article of the present technology. In case of a gas-phase reactor, in some embodiments it consists of a fluidized or a stirred, fixed bed reactor or a reactor comprising two interconnected polymerization zones, one of which may be working under fast fluidization conditions and the other in which the polymer flows under the action of gravity. The liquid phase process can be either in slurry, solution or bulk (liquid monomer). This latter technology can be carried out in various types of reactors such as continuous stirred tank reactors, loop reactors or plug-flow ones. The polymerization may be carried out at a temperature of from 20 to 120° C., such as from 40 to 85° C. When the polymerization is carried out in gas-phase, the operating pressure is, in certain embodiments, between 0.5 and 10 MPa, including between 1 and 5 MPa. In the bulk polymerization the operating pressure may be between 1 and 6 MPa, such as between 1.5 and 4 MPa. In some embodiments, the copolymer for use in the healthcare or medical article of the present technology is prepared by polymerizing propylene in mixture with ethylene in liquid monomer in a loop reactor.

In certain embodiments, hydrogen can be used as a molecular weight regulator.

Conventional additives, fillers and pigments, commonly used in olefin polymers, may be added, such as nucleating agents, extension oils, mineral fillers, and other organic and inorganic pigments. The addition of inorganic fillers, such as talc, calcium carbonate and mineral fillers, in certain embodiments may result in an improvement to some mechanical properties, such as flexural modulus and HDT. In addition, talc can have a nucleating effect.

EXAMPLES

The following examples are given to illustrate the present technology without any limiting purpose.

Test Methods

Molar Ratio of Feed Gases

Determined by gas-chromatography.

Average Particle Size of the Adduct and Catalysts

Determined by a method based on the principle of the optical diffraction of monochromatic laser light with the "Malvern Instrument 2600" apparatus. The average size is given as P50.

Comonomer Content

The content of ethylene comonomer was determined by infrared spectroscopy by collecting the IR spectrum of the sample vs. an air background with a Fourier Transform Infrared spectrometer (FTIR). The instrument data acquisition parameters are:

purge time: 30 seconds minimum
collect time: 3 minutes minimum
apodization: Happ-Genzel
resolution: 2 $cm^{-1}$.

Sample Preparation—

Using a hydraulic press, a thick sheet is obtained by pressing about 1 g of sample between two aluminum foils. A small portion is cut from this sheet to mold a film. The film thickness ranges between 0.02 and 0.05 cm (8-20 mils). The pressing temperature is 180±10° C. (356° F.) and about 10 $kg/cm^2$ (142.2 PSI) of pressure is applied for about one minute. The pressure is released, the sample removed from the press and cooled to room temperature.

The spectrum of the pressed film sample is recorded in absorbance vs. wavenumbers ($cm^{-1}$). The following measurements are used to calculate ethylene content:

Area (At) of the combination absorption bands between 4482 and 3950 $cm^{-1}$, which is used for spectrometric normalization of film thickness;

Area (AC2) of the absorption band between 750-700 $cm^{-1}$ after two proper consecutive spectroscopic subtractions of an isotactic non-additivated polypropylene spectrum and then of a reference spectrum of an ethylene-propylene random copolymer in the range 800-690 $cm^{-1}$;

Height (DC4) of the absorption band at 769 $cm^{-1}$ (maximum value), after two proper consecutive spectroscopic subtractions of an isotactic non-additive polypropylene spectrum and then of a reference spectrum of an ethylene-propylene random copolymer in the range 800-690 $cm^{-1}$.

In order to calculate the ethylene content, a calibration straight line for ethylene is obtained by using samples of the known amount of ethylene needed and is obtained by plotting AC2/At versus ethylene molar percent (% C2m). The slope GC2 is calculated from a linear regression.

The spectra of the unknown samples are recorded and (At), (AC2) and (DC4) of the unknown sample are calculated. The ethylene content by weight is obtained from the ethylene content (% molar fraction C2m) of the sample as follows:

$$\%C2m = \frac{1}{G_{C2}} \cdot \frac{A_{C2}}{A_t}$$

Melt Flow Rate (MFR "L")

Determined according to ISO 1133 (230° C., 2.16 Kg).

Melting Temperature ($T_m$) and Crystallization Temperature ($T_c$)

Both determined by differential scanning calorimetry (DSC) according to the ASTM D 3417 method, which is equivalent to the ISO 11357/1 and 3 methods.

Xylene Solubles

Determined as follows: 2.5 g of polymer and 250 ml of xylene are introduced in a glass flask equipped with a refrigerator and a magnetic stirrer. The temperature is raised in 30 minutes up to the boiling point of the solvent. The resulting clear solution is then kept under reflux and stirring for further 30 minutes. The closed flask is then kept in thermostatic water bath at 25° C. for 30 minutes. The resulting solid is filtered on quick filtering paper. 100 ml of the filtered liquid is poured in a previously weighed aluminum container, which is heated on a heating plate under nitrogen flow, to remove the solvent by evaporation. The container is then kept on an oven at 80° C. under vacuum until a constant weight is obtained. The weight percentage of polymer soluble in xylene at room temperature is then calculated.

Flexural Modulus (MEF)

Determined according to ISO 178.

Izod Impact Strength

Determined according to ISO 180/1A.

Ductile Brittle Transition Temperature (DB/TT)

The bi-axial impact resistance is determined through impact with an automatic, computerized striking hammer. The circular test specimens are obtained by cutting with a circular hand punch (38 mm diameter) plaques obtained as described below. The circular test specimens are conditioned for at least 12 hours at 23° C. and 50 RH and then placed in a thermostatic bath at testing temperature for 1 hour. The force-time curve is detected during impact of a striking hammer (5.3 kg, hemispheric punch with a ½" diameter) on a circular specimen resting on a ring support. The machine used is a CEAST 6758/000 Model No. 2. The DB/TT is the temperature at which 50% of the sample undergoes fragile break when submitted to the above-mentioned impact test. The plaques for DB/TT measurements, having dimensions of 127×127×1.5 mm, are prepared according to the following method. The injection press is a Negri Bossi™ Type NB 90 with a clamping force of 90 tons. The mold is a rectangular plaque (127×127×1.5 mm). The main process parameters are reported below:

Back pressure: 20 bar
Injection time: 3 sec
Maximum Injection pressure: 14 MPa
Hydraulic injection pressure: 6-3 Mpa
First holding hydraulic pressure: 4±2 Mpa
First holding time: 3 sec
Second holding hydraulic pressure: 3±2 Mpa
Second holding time: 7 sec
Cooling time: 20 sec Mold temperature: 60° C.
Melt temperature 220 to 280° C.
Stress at Yield and Elongation at Break
Determined according to ISO 527.

Haze on Plaque

The plaques are prepared by using a Battenfeld™ Type BA 500CD injection press with a clamping force of 50 tons. The insert mold leads to the molding of two plaques (55× 60×1 mm each). The plaques are conditioned for 12 to 48 hours at a relative humidity of 50±5% and a temperature of 23±1° C. The instrument used for the test is a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze). The measurement and computation principle are given in the norm ASTM-D1003. The haze measurement is carried out on five plaques.

Haze on Film

Cast film specimens with a thickness of 50 μm are prepared by extruding each polymer composition in a single screw Collin extruder (length/diameter ratio of screw: 30) at a film drawing speed of 7 m/min and a melt temperature of 210-250° C. Haze on film is determined on 50 μm thick films of the test composition, prepared as described above. The measurement is carried out on a 50×50 mm portion cut from the central zone of the film. The instrument used for the test is a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

Haze on Bottles

The same method and instrument described for haze measurement on plaque is used. Samples of 1.4 mm thickness are cut from bottles' bottom in order to obtain a flat sample that the specimen holder could grasp.

Top Load on Bottles

An Instron dynamometer equipped with a balance of 0.2 g accuracy and with a micrometer of 0.01 mm accuracy is used. After at least 10 hours of conditioning at 23°±1° C. and 50% relative humidity, the bottle is placed between the two plates of the dynamometer and compressed with a stress velocity of the plate of 5 cm/min. The stress at collapse of the bottle is recorded and the value reported in N. The top load value is the mean value obtained from measurements repeated on 10 bottles.

Sterilization Procedure

The sample is placed in a steam sterilization autoclave Systec DX-65 set at 121° C. and 2.1 bar of nitrogen internal pressure. After 20 minutes of treatment in the autoclave, the item is cooled to room temperature and conditioned at room temperature for 48 hours before testing.

Example 1C (Comparative)

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2.2.1C_2H_5OH$ having average particle size of 47 μm (prepared in accordance with the method described in example 1 of EP728769) and an amount of diethyl 2,3-diisopropylsuccinate to produce a Mg/succinate molar ratio of 15 were added. The temperature was raised to 100° C. and kept at this value for 60 minutes. The stirring was then stopped and the liquid was siphoned off. After siphoning, fresh $TiCl_4$ and an amount of 9,9-bis (methoxymethyl)fluorene such as to have a Mg/diether molar ratio of 30 were added. The temperature was raised to 110° C. and kept for 30 minutes under stirring. After sedimentation and siphoning at 85° C., fresh TiCl$_4$ was added and the temperature was raised to 90° C. for 15 min. After sedimentation and siphoning at 90° C. the solid was washed three times with anhydrous hexane (3×100 ml) at 60° C. and an additional three times with anhydrous hexane (3×100 ml) at 25° C. The resulting solid catalyst component had a total amount of internal electron donor compounds of 12.0% by weight with respect to the weight of the solid catalyst component.

Preparation of the Catalyst System—Precontact

Before introducing it into the polymerization reactors, the solid catalyst component described above is contacted with aluminum-triethyl (TEAL) and with the dicyclopentyldimethoxysilane (D donor) under the conditions reported in Table 1.

Prepolymerization

The catalyst system is then subject to prepolymerization treatment at 20° C. by maintaining it in suspension in liquid propylene for a residence time of 9 minutes before introducing it into the polymerization reactor.

Polymerization

The polymerization was carried out in continuous mode in a liquid phase loop reactor. Hydrogen was used as a molecular weight regulator. The polymer particles exiting from the polymerization step were subjected to a steam treatment to remove the unreacted monomers and dried under a nitrogen flow.

The main precontact, prepolymerization and polymerization conditions and the quantities of monomers and hydrogen fed to the polymerization reactor are reported in Table 1. Characterization data for the obtained polymers are reported in Table 2.

The polymer particles were introduced in an extruder, wherein they were mixed with 1500 ppm of Irganox 1010, 900 ppm of Irgafos 168 and 150 ppm of DHT-4A. Irganox 1010 is pentaerytrityl tetrakis 3-(3,5-di-tert-butyl-4-hydroxyphenyl) propanoate, while Irgafos 168 is tris(2,4-di-tert-butylphenyl) phosphite (Ciba Geigy). The polymer particles were extruded under a nitrogen atmosphere in a twin screw extruder, at a rotation speed of 250 rpm, and a melt temperature of 200-250° C.

Preparation of Bottle Specimens

Cylindrical 1 L bottles (35 g) were prepared from the compositions of the examples, with a blow molding machine AUTOMA SPEED 3M—Extrusion continuous Incline Shuttle. The main process parameters are reported below:
 screw diameter: 70 mm
 length/diameter (L/D) ratio: 24
 melt temperature: 250° C.
 mold temperature: 25° C.
The bottles were tested for haze and top load properties. Characterization results are reported in Table 2.

Examples 2 and 3C (Comparative)

These examples were worked according to Example 1C, except that the polymerization run was conducted in continuous mode in a gas-phase polymerization reactor comprising two interconnected polymerization zones, a riser and a downcomer, as described in European Patent EP782587, and in the granulation step 20 ppm of Luperox 101 were added.

The main precontact, prepolymerization and polymerization conditions and the quantities of monomers and hydrogen fed to the polymerization reactor are reported in Table 1. Characterization data for the obtained polymers and bottles are reported in Table 2.

TABLE 1

Process conditions

| | | Example | | |
|---|---|---|---|---|
| | | 1C | 2 | 3C |
| TEAL/external donor | wt/wt | 5.1 | 3 | 3 |
| TEAL/catalyst | wt/wt | 28 | 6 | 8 |
| TEAL/C$_3^-$ | Kg/t | 0.17 | N/A | N/A |
| Temperature | ° C. | 70 | 70 | 70 |
| Pressure | bar-g | 38.9 | 25 | 25 |
| Split holdup riser | wt % | N/A | 39 | 42 |
| Split holdup downcomer | wt % | N/A | 61 | 58 |
| C$_2^-$ riser | mole % | N/A | 2.7 | 2.4 |
| C$_2^-$ feed | Kg/h | 2.1 | N/A | N/A |
| H$_2$/C$_3^-$ riser | mol/mol | N/A | 0.007 | 0.01 |
| H$_2$ feed concentration | ppm | 750 | N/A | N/A |

Notes:
C$_2^-$ = ethylene;
C$_3^-$ = propylene;
H$_2$ = hydrogen;
N/A = not applicable

TABLE 2

Polymers and bottles characterization

| | | Example | | |
|---|---|---|---|---|
| | | 1C | 2 | 3C |
| MFR | g/10' | 1.7 | 0.70 | 0.82 |
| MFR after visbreaking | g/10' | N/A | 2.22 | 1.93 |
| Ethylene units | % wt | 3.0 | 4.9 | 5.5 |
| M$_w$/M$_n$ | | n/a | 6.9 | 6.1 |
| XS | % | 5.2 | 12.2 | 14.1 |
| Tm | ° C. | 146.6 | 137.0 | 134.2 |
| Tc | ° C. | 100.6 | 92.2 | 88.6 |
| MEF | MPa | 1031 | 570 | 530 |
| MEF after sterilization | MPa | 1131 | 650 | 590 |
| Izod Impact 23° C. | kJ/m$^2$ | 11.0 | 14.1 | 27.7 |
| Izod Impact 0° C. | kJ/m$^2$ | n/a | 4.4 | 6.9 |
| Izod Impact −20° C. | kJ/m$^2$ | n/a | 2.5 | 2.7 |
| D/B TT | ° C. | >10 | −3.0 | −7.0 |
| Stress at yield | MPa | 23.8 | 20.3 | 19.0 |
| Elongation at break | % | 608 | 460 | 460 |
| Haze on 1 mm plaque | % | 45.7 | 27.4 | 24.1 |
| Haze/plaque after steriliz. | % | n/a | 42.6 | 46.0 |
| Haze on 50μ cast film | % | n/a | 0.1 | 0.3 |
| Haze/film after steriliz. | % | n/a | 11.8 | 15.2 |
| Haze on 1-litre bottle (35 gr) | % | 46.3 | 24.5 | 28.5 |
| Haze/bottle after steriliz. | % | 48.4 | 29.2 | 33.8 |
| Top load on bottle | N | 318 | 185 | 165 |

Notes:
N/A = not applicable;
n/a = not available

What is claimed is:

1. A healthcare or medical article comprising a propylene-ethylene copolymer having:
 (i) a content of ethylene units comprised between 4.0-5.4% by weight,
 (ii) a value of melt flow rate "L" (230° C., 2.16 kg) of 1.0-3.0 g/10 min, and
 (iii) a flexural modulus of lower than 700 MPa.

2. The article of claim 1, wherein the propylene-ethylene copolymer has a fraction soluble in xylene at room temperature of between 10.0% and 15.0% by weight.

3. The article of claim 1, wherein the article is produced by the Blow-Fill-Seal (BFS) technology.

4. The article of claim 1, wherein the article is a container.

5. The article of claim 4, wherein the article is selected from the group consisting of a bottle, a bag and a pouch.

6. The healthcare or medical article of claim 1 having a haze value before sterilization, as measured on a 1 mm plaque, lower than 40%, and having a haze value after sterilization, as measured on a 1 mm plaque, lower than 45%.

7. The healthcare or medical article of claim 6 having a haze value before sterilization, as measured on a 1 mm plaque, lower than 30%.

8. The healthcare or medical article of claim 7 having a melting temperature of 135° C. to 140° C.; a flexural modulus of lower than 700 MPa, both before and after heat sterilization; and a molecular weight distribution Mw/Mn of higher than 4.0.

9. The healthcare or medical article of claim 8 having a molecular weight distribution Mw/Mn of higher than 5.0.

10. The healthcare or medical article of claim 6 having a melting temperature of 135° C. to 140° C.

11. The healthcare or medical article of claim 6 having a flexural modulus of lower than 700 MPa, both before and after heat sterilization.

12. The healthcare or medical article of claim 6 having a molecular weight distribution Mw/Mn of higher than 4.0.

13. The healthcare or medical article of claim 6 having a molecular weight distribution Mw/Mn of higher than 5.0.

14. The healthcare or medical article of claim 6 having a melting temperature of 135° C. to 140° C.; a flexural modulus of lower than 700 MPa, both before and after heat sterilization; and a molecular weight distribution Mw/Mn of higher than 4.0.

15. The healthcare or medical article of claim 14 having a molecular weight distribution Mw/Mn of higher than 5.0.

16. A process for the preparation of the healthcare or medical article of claim 1 wherein the article is produced by extruding or blow molding the product of the copolymerization of propylene and ethylene in the presence of a catalyst system comprising the product obtained by contacting the following components:
(a) a solid catalyst component comprising a magnesium halide, a titanium compound having at least a Ti-halogen bond and at least two electron donor compounds, wherein the first electron donor compound is present in an amount from 40 to 90% by mole with respect to the total amount of donors and is succinate compound, and the second electron donor compound is 1,3 diether compound,
(b) an aluminum hydrocarbyl compound, and
(c) optionally an external electron donor compound.

17. The process of claim 16, wherein the succinate compound is of the general formula (I):

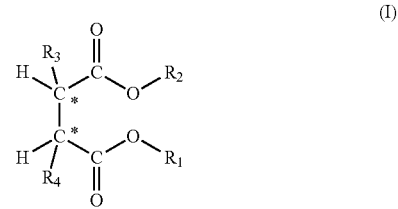

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals R3 and R4 equal to, or different from, each other, are $C_1$-$C_{20}$ alkyl, $C_3$-$C_{20}$ cycloalkyl, $C_5$-$C_{20}$ aryl, arylalkyl or alkylaryl group, at least one of the radicals is a branched alkyl; said compounds being, with respect to the two asymmetric carbon atoms identified in the structure of formula (I), stereoisomers of the type (S,R) or (R,S).

18. The process of claim 16, wherein the 1,3-diether is of the general formula (II):

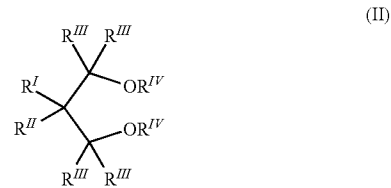

wherein RI and RII are the same or different and are hydrogen or linear or branched C1-C18 hydrocarbon groups which can also form one or more cyclic structures; the RIII groups, equal or different from each other, are hydrogen or C1-C18 hydrocarbon groups; the RIV groups equal or different from each other, have the same meaning of RIII except that they cannot be hydrogen; and each of the RI-MV groups optionally contain heteroatoms selected from halogens, N, O, S and Si.

19. The process of claim 16, wherein the catalyst component (a) has an average particle size from 15 to 80 μm.

20. The process according to claim 16, wherein the succinate is present in amount ranging from 40 to 90% by moles with respect to the total amount of internal donors.

* * * * *